(12) United States Patent
Lin

(10) Patent No.: US 10,294,659 B1
(45) Date of Patent: May 21, 2019

(54) MULTIDIRECTIONAL ALUMINUM EXTRUSION CONNECTION DEVICE

(71) Applicant: Ruei-Hsing Lin, New Taipei (TW)

(72) Inventor: Ruei-Hsing Lin, New Taipei (TW)

(*) Notice: Subject to any disclaimer, the term of this patent is extended or adjusted under 35 U.S.C. 154(b) by 0 days.

(21) Appl. No.: 15/807,580

(22) Filed: Nov. 9, 2017

(51) Int. Cl.
  *E04B 1/12* (2006.01)
  *E04B 1/41* (2006.01)
  *E06B 1/12* (2006.01)
  *E04B 2/76* (2006.01)

(52) U.S. Cl.
  CPC .................. *E04B 1/40* (2013.01); *E04B 2/76* (2013.01); *E06B 1/12* (2013.01)

(58) Field of Classification Search
  CPC ..... E04B 1/40; E04B 2/76; E06B 1/12; Y10T 103/42; Y10T 103/55; Y10T 103/555; Y10T 103/557
  USPC .................................................. 52/656.9, 698
  See application file for complete search history.

(56) References Cited

U.S. PATENT DOCUMENTS

| | | | | |
|---|---|---|---|---|
| 3,898,728 A * | 8/1975 | Rousseau | ............ | B21D 53/74 29/446 |
| 4,090,799 A * | 5/1978 | Crotti | ............ | B29C 65/08 40/782 |
| 4,145,150 A * | 3/1979 | Rafeld | ............ | E06B 3/667 403/295 |
| 5,112,157 A * | 5/1992 | Haarer | ............ | A47H 1/02 211/105.1 |
| 5,378,077 A * | 1/1995 | Paulsen | ............ | E06B 3/9682 403/205 |
| 5,430,985 A * | 7/1995 | Coleman | ............ | E04C 1/42 52/308 |
| 5,613,796 A * | 3/1997 | Salice | ............ | E05D 5/08 292/34 |
| 5,806,263 A * | 9/1998 | Coleman | ............ | E04C 1/42 362/145 |
| 5,893,245 A * | 4/1999 | Sekiguchi | ............ | E04F 13/0816 403/295 |
| 5,921,049 A * | 7/1999 | Sugiyama | ............ | E04B 1/2604 403/230 |

(Continued)

FOREIGN PATENT DOCUMENTS

FR          2556402 A1 *   6/1985   ............ E06B 3/9644

*Primary Examiner* — Charles A Fox
*Assistant Examiner* — James J Buckle, Jr.
(74) *Attorney, Agent, or Firm* — Leong C. Lei

(57) ABSTRACT

A multidirectional aluminum extrusion connection device includes a direction-change coupling member having two ends respectively forming first and second coupling sections arranged in an angularly-staggered manner to extend in different directions for each connectable with a connection member. A first aluminum extrusion plate is provided to receive one of the connection members to extend therethrough so as to be set at a location corresponding to the first coupling section. A second aluminum extrusion plate is provided to receive the other one of the connection members to extend therethrough so as to be set at a location corresponding to the second coupling section. The first and second aluminum extrusion plates are thus connected in an angularly staggered manner to form a connection module having and defining a corner. The connection members may be additionally connected two pre-prepared aluminum extrusion parts for respectively coupling to the first and second aluminum extrusion plats.

8 Claims, 7 Drawing Sheets

(56) References Cited

U.S. PATENT DOCUMENTS

| | | | | |
|---|---|---|---|---|
| 7,451,576 B2 * | 11/2008 | Barone | ............... | E04F 21/0069 |
| | | | | 403/402 |
| 7,770,315 B2 * | 8/2010 | Bauer | ...................... | A47G 1/02 |
| | | | | 40/209 |
| 2013/0205706 A1 * | 8/2013 | Beranek | ................ | E06B 3/9682 |
| | | | | 52/656.9 |

* cited by examiner

MULTIDIRECTIONAL ALUMINUM EXTRUSION CONNECTION DEVICE

TECHNICAL FIELD OF THE INVENTION

The present invention generally relates to a multidirectional aluminum extrusion connection device, and more particularly to one including a direction-change coupling member having two ends each connected with a connection member to set the two the connection members in an angularly staggered manner for extension in different directions and a first aluminum extrusion plate through which one of the connection members is received through and a second aluminum extrusion plate through which the other one of the connection members is received through are provided such that the first and second aluminum extrusion plates are connected to the direction-change coupling member in an angularly staggered manner to form a connection module that includes and defines a corner, wherein with connection established between each of the connection members an aluminum extrusion piece that is prepared in advance, two pre-prepared aluminum extrusion pieces can be readily set to connect with the first and second aluminum extrusion plates to allow an operator to carry out an installation operation as required to fast construct a corner connection between two aluminum extrusion plates and thus effectively reduce operation time of installation and fast complete a systematic structure.

DESCRIPTION OF THE PRIOR ART

Light support frame structures that are commonly used are generally constructed with aluminum extrusion pieces that are made of aluminum alloys as the primary construction materials, due to the advantage of being light weight and high stiffness, allowing them to make and function a basic frame of an exhibition housing or division frames, partition frames for separating individual office desks, and even frames for aluminum windows and doors, all falling within the wide range of application thereof. Thus, assembly structures of aluminum extrusions and solutions thereof are the key factors for competition of such products. Up to date, most of the manufacturers only work on jointing of multiple aluminum extrusion frames and do not provide any systematic structure or series of product assembly.

The known ways of jointing, when applied to an actual operation, require the screws to be screwed into the connection plate by consuming a large amount of time and labor in assembling and disassembling. This makes it not possible to practically achieve a fast and easy operation for installation or construction. In addition, the operation of assembling or disassembling requires tools for the screwing operation, such as screwdrivers, in order to properly carry out the assembling or disassembling operation. In addition, due to the screws being screwed into the connection plate, wear and abrasion, and thus damage, of a surface structure of the aluminum extrusion frame parts often occur and this may eventually lead to undesired or unexpected corrosion of the surface. Further, disassembling a frame made up of aluminum extrusion frame parts that are jointed with connection plates often results in non-repeated use of the connection plates. And, this causes a severe burden of cost loss for the consumable parts. All these are issues of the industry that have long been not resolved. Particularly, the manufacturers generally have no feasible solutions for assembling and making of systematic structures that involve relatively complicated series, and what they can do is trial-and-error measures.

Further, to make a connection at a corner for the known aluminum extrusion frames, an L-shaped connection plate is often involved to which two aluminum extrusion frame parts are screwed to form a fixed corner. This results in a tedious and inconvenient process of assembling and the strength of the structure so formed is weak.

Thus, it is the purpose of the present invention to provide a solution that allows the aluminum extrusion frames to form an assembled connection of a corner in a fast and non-screwing manner to achieve an effect of high flexibility in respect of angular variation and completely fitting the constraints imposed by the surroundings in making a corner thereby efficiently and effectively making assembly of serial and systematic structures.

SUMMARY OF THE INVENTION

The present invention discloses an aluminum extrusion connection device, which comprises two connection members, a direction-change coupling member, a first aluminum extrusion plate, and a second aluminum extrusion plate. The direction-change coupling member is formed with a first coupling section at one end thereof and a second coupling section at the other end thereof. The first coupling section and the second coupling section are arranged in an angularly staggered manner to extend in different directions so that the first coupling section and the second coupling section define an angle (such as a 90 degree angle) therebetween. The first coupling section is connected to one of the connection members and the second coupling section is connected to the other one of the connection members. The first aluminum extrusion plate is formed with a first fitting slot, and the one of the connection member and the first coupling section of the direction-change coupling member are received into and through the first fitting slot to set the first aluminum extrusion plate at a location corresponding to the first coupling section; and the second aluminum extrusion plate is formed with a second fitting slot, and the other one of the connection members and the second coupling section of the direction-change coupling member are received into and through the second fitting slot to set the second aluminum extrusion plate at a location corresponding to the second coupling section. Thus, the first aluminum extrusion plate and the second aluminum extrusion plate are connected to the direction-change coupling member in a manner of being angularly staggered with respect to each other to form a connection module having and defining a corner.

The features of the present invention is that the two ends of the direction-change coupling member are respectively formed with the first coupling section and the second coupling section that are arranged in an angularly staggered manner and extend in different directions with the first coupling section and the second coupling section each connected with one connection members, wherein a first aluminum extrusion plate is provided to receive one of the connection members therethrough to be set at a location corresponding to the first coupling section and a second aluminum extrusion plate is provided to receive the other one of the connection members to extend therethrough to be set at a location corresponding to the second coupling section so that the first aluminum extrusion plate and the second aluminum extrusion plate are connected in an angularly staggered manner to form a connection module having and defining a corner. In this way, each of the connection members is allow to further couple to a pre-prepared aluminum extrusion piece, generally in the form of a plate also, to allow the two pre-pared aluminum extrusion pieces to respectively connect with the first aluminum extrusion plate and the second aluminum extrusion plate to allow an operator to carry out an installation operation as required to fast construct a corner connection between two aluminum extrusion plates and thus effectively reduce operation time of installation and fast complete a systematic structure.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
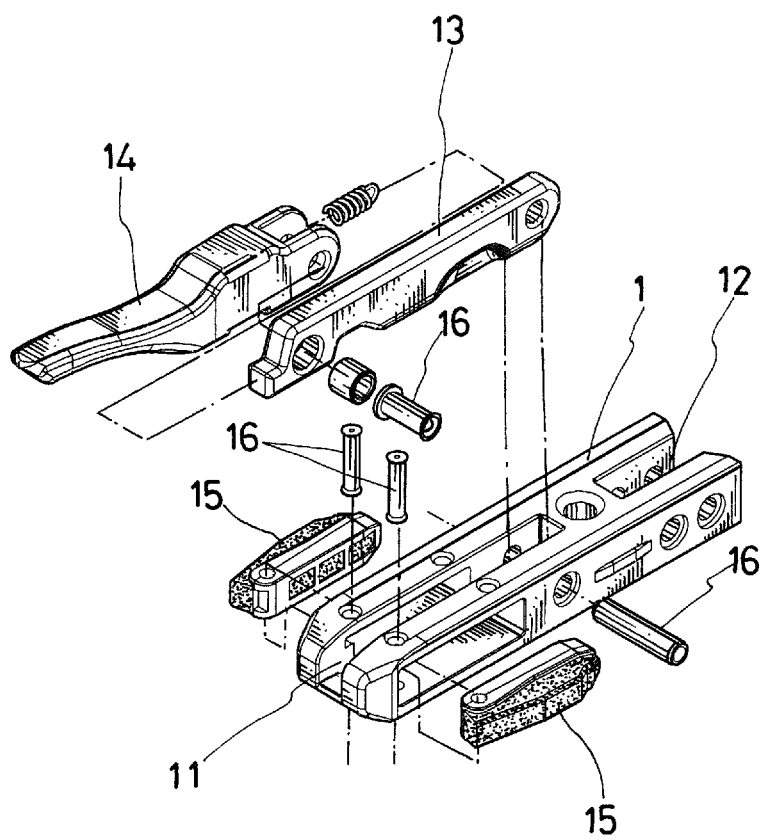
FIG. 1 is an exploded view of a connection member of an aluminum extrusion connection device according to the present invention.
Figure 2:
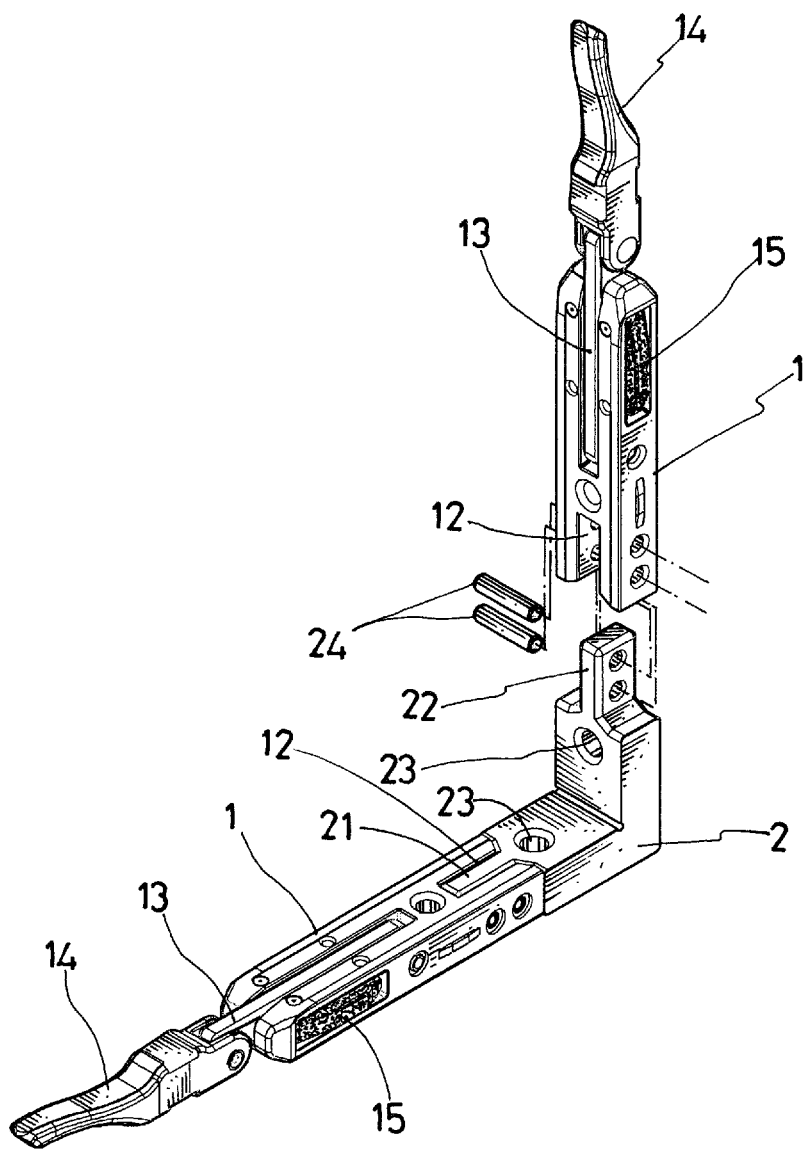
FIG. 2 is a schematic view showing an embodiment of the connection member of the aluminum extrusion connection device according to the present invention.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring first to FIGS. 1-4, the present invention provides a multidirectional aluminum extrusion connection device, which is applicable to connection with at least two fourth aluminum extrusion plates 8 (which are aluminum extrusion parts prepared separately). The aluminum extrusion connection device of the present invention comprises two connection members 1, a direction-change coupling member 2, a first aluminum extrusion plate 4, and a second aluminum extrusion plate 5.

The connection members 1 are each formed with a first open groove 11 in one end thereof and a second open groove 12 in another end thereof. The first open groove 11 is pivotally connected with a bar 13 (at one end of the bar) by means of a first fastening element 16 such that the bar 13 is capable of being pushed or moving or rotating up and down in the first open groove 11 of the connection member 1 with an opposite end of the bar 13 extending outside the first open groove 11 and pivotally connected with a pressing stem 14. The pressing stem 14 is pivotally connected, similarly by means of a first fastening element 16, to said opposite end of the bar 13. Further, the connection member 1 is provided, on each of two opposite sides thereof, with a compression block 15 connected thereto by means of a first fastening element 16 such that a part of the compression block 15 projects outside a sidewall of the connection members 1.

The direction-change coupling member 2 is connected with the two connection members 1. The direction-change coupling member 2 is formed with a first coupling section 21 at one end thereof and a second coupling section 22 at the other end thereof. The first coupling section 21 and the second coupling section 22 are arranged in an angularly staggered manner to extend in different directions so that the first coupling section 21 and the second coupling section 22 define therebetween an angle that could be a right angle in the longitudinal or vertical direction (such as an included angle of 90 degrees in a vertical plane). The first coupling section 21 is connected to the second open groove 12 of one of the connection members 1 and the second coupling section 22 is connected to the second open groove 12 of the other one of the connection members 1. The direction-change coupling member 2 is formed with a fastening hole 23 at a location adjacent to the first coupling section 21 and the direction-change coupling member 2 is also formed with a fastening hole 23 similarly at a location adjacent to the second coupling section 22.

Further, the first coupling section 21 of the direction-change coupling member 2 is connected, by means of at least one second fastening element 24, to the second open groove 12 of one of the connection members 1, while the second coupling section 22 of the direction-change coupling member 2 is similarly connected, by means of at least one second fastening element 24, to the second open groove 12 of the other one of the connection members 1.

The first aluminum extrusion plate 4 is connectable to one of the connection members 1. The first aluminum extrusion plate 4 is formed with a first fitting slot 41 and two first positioning holes 42 that are respectively formed in two opposite sides of the first fitting slot 41. Said one of the connection members 1 and the first coupling section 21 of the direction-change coupling member 2 are received into and partly through the first fitting slot 41 of the first aluminum extrusion plate 4, so that the first aluminum extrusion plate 4 is set at a location corresponding to the first coupling section 21 and the connection member 1 that is received through the first fitting slot 41 projects outside the first aluminum extrusion plate 4.

The second aluminum extrusion plate 5 is connectable to the other one of the connection members 1. The second aluminum extrusion plate 5 is formed with a second fitting slot 51 and two second positioning holes 52 that are formed in two opposite sides of the second fitting slot 51. Said other one of the connection members 1 and the second coupling section 22 of the direction-change coupling member 2 are received into and partly through the second fitting slot 51 of the second aluminum extrusion plate 5, so that the second aluminum extrusion plate 5 is set at a location corresponding to the second coupling section 22 and the connection member 1 that is received through the second fitting slot 51 projects outside the second aluminum extrusion plate 5.

Figure 3:
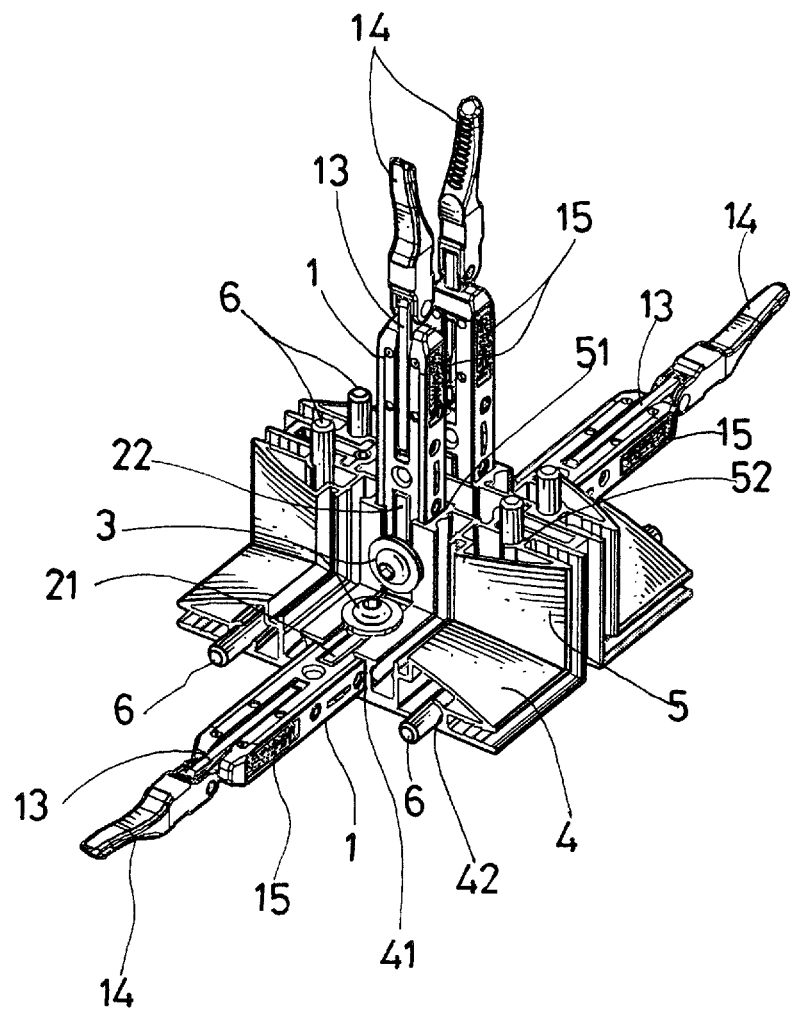
FIG. 3 is a schematic view showing a first embodiment of the aluminum extrusion connection device according to the present invention.
Figure 4:
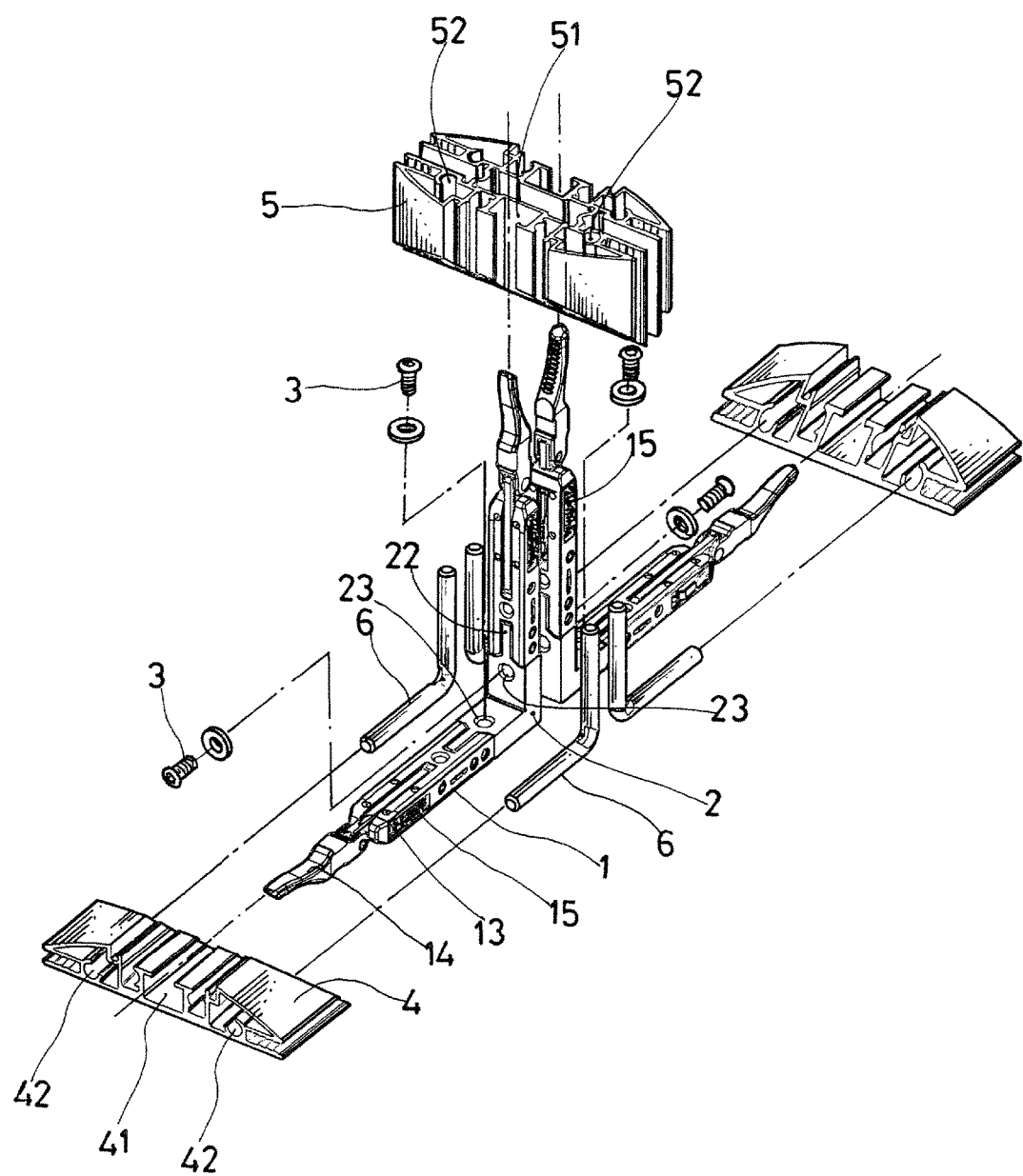
FIG. 4 is an exploded view showing the first embodiment of the aluminum extrusion connection device according to the present invention.
Figure 5:
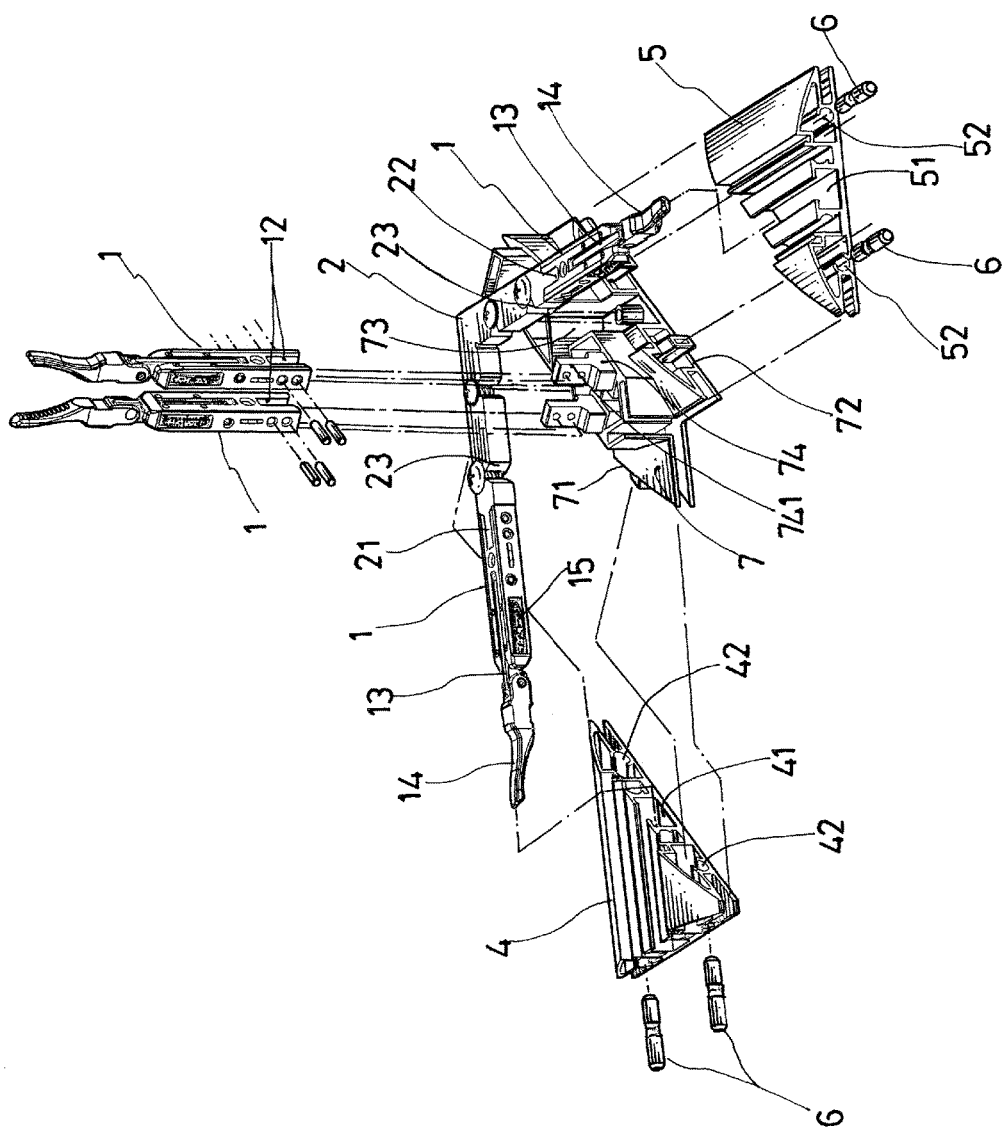
FIG. 5 is an exploded view showing a second embodiment of the aluminum extrusion connection device according to the present invention.

An example of the present invention is provided as a first embodiment. To assemble the two connection members 1, the direction-change coupling member 2, the first aluminum extrusion plate 4, and the second aluminum extrusion plate 5 together, one of the connection members 1 and the first coupling section 21 of the direction-change coupling member 2 are first set into and partly through the first fitting slot 41 of the first aluminum extrusion plate 4 to set the first aluminum extrusion plate 4 at a location corresponding to the first coupling section 21. Under such a condition, the fastening hole 23 of the first coupling section 21 is located in the first fitting slot 41 so that with a third fastening element 3 fit into and mounted to the fastening hole 23, the first aluminum extrusion plate 4 is fixed to the first coupling section 21 and the two first positioning holes 42 of the first aluminum extrusion plate 4 may each receive a fixing rod 6 to insert therein. Next, the other one of the connection members 1 and the second coupling section 22 of the direction-change coupling member 2 are then received into and partly through the second fitting slot 51 of the second aluminum extrusion plate 5 to set the second aluminum extrusion plate 5 at a location corresponding to the second coupling section 22. Under such a condition, the fastening hole 23 of the second coupling section 22 is located in the second fitting slot 51 so that similarly with a third fastening element 3 fit into and mounted to the fastening hole 23, the second aluminum extrusion plate 5 is fixed to the second coupling section 22 and the two second positioning holes 52 of the second aluminum extrusion plate 5 may each receive an opposite end of the fixing rod 6 to insert therein. In this way, the first aluminum extrusion plate 4 and the second aluminum extrusion plate 5 can be fixedly connected together to form a connection module involving a corner (as shown in FIG. 3).

Figure 8:
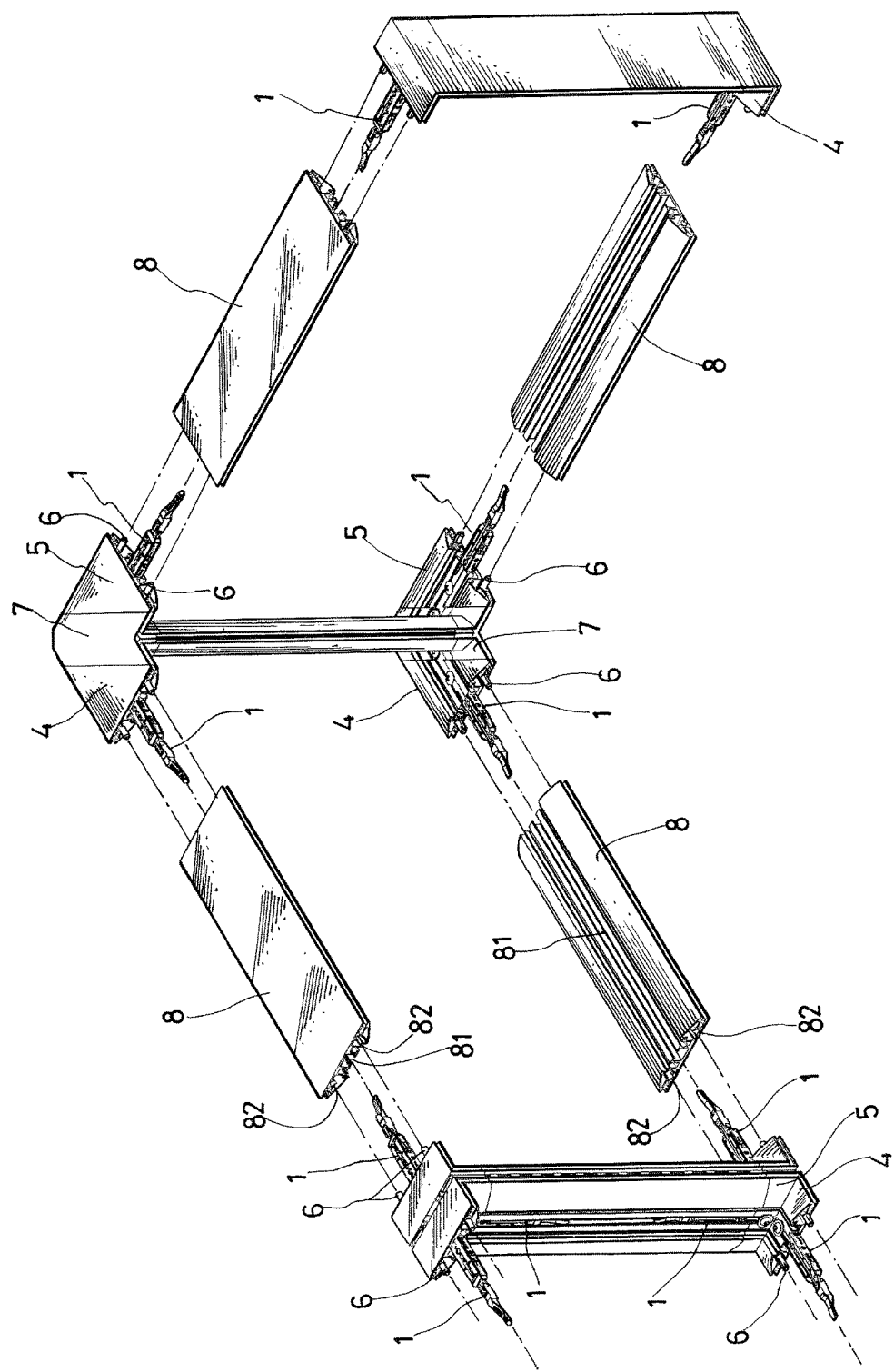
FIG. 8 is a schematic view showing a third embodiment of the aluminum extrusion connection device according to the present invention.

Here, with the two connection members 1 respectively projecting outside the first aluminum extrusion plate 4 and the second aluminum extrusion plate 5, each of the connection members 1 can be used to connect a fourth aluminum extrusion plate (or an aluminum extrusion part prepared separately) 8 (as shown in FIG. 8). The fourth aluminum extrusion plate 8 may be formed with a third fitting slot 81 and two third positioning holes 82 that are formed in two opposite sides of the third fitting slot 81. With the connection members 1 each being respectively received into and set in the third fitting slot 81 of one fourth aluminum extrusion plate 8 such that the pressing stem 14 of the connection member 1 is fit into the third fitting slot 81, the compression blocks 15 arranged on two opposite sides of the connection members 1 can be set in engagement with the third fitting slot 81 (such as for example sidewalls thereof) so as to have the connection member 1 securely fixed to the fourth aluminum extrusion plate 8. Further, with the fourth aluminum extrusion plate 8 connected to the first aluminum extrusion plate 4, the third positioning holes 82 of the fourth aluminum extrusion plate 8 and the first positioning holes 42 of the first aluminum extrusion plate 4 (preferably, in a condition of being in alignment with each other) may respectively receive fixing rods 6 to insert therein and with the fourth aluminum extrusion plate 8 connected to the second aluminum extrusion plate 5, the third positioning holes 82 of the fourth aluminum extrusion plate 8 and the second positioning holes 52 of the second aluminum extrusion plate 5 (preferably, in a condition of being in alignment with each other) may respectively receive fixing rods 6 to insert therein. In this way, the two fourth aluminum extrusion plates 8 that are provided and prepared in advance may thus be connected to a corner made up of and defined by the first aluminum extrusion plate 4 and the second aluminum extrusion plate 5 to allow an operator to carry out an installation operation as required to fast construct a corner connection between two pre-prepared aluminum extrusion plates 8 and thus effectively reduce operation time of installation.

Referring next to FIGS. 5-8, an example of the present invention is provided as a second embodiment, which further comprises a third aluminum extrusion plate 7, wherein at least four connection members 1 are involved. The third aluminum extrusion plate 7 is provided with a first jointing end 71 on one lateral side thereof and a second jointing end 72 on another lateral side thereof. The third aluminum extrusion plate 7 is partly recessed to form a jointing trough 73 and is provided with at least two jointing blocks 74 extending in a longitudinal or vertical direction, wherein each of the jointing blocks 74 is provided with a third jointing section 741 extending in an upward direction. Further, the first coupling section 21 and the second coupling section 22 of the direction-change coupling member 2 are arranged in an angularly staggered manner to respectively extend in different directions so that the first coupling section 21 and the second coupling section 22 define therebetween an angle that could be a right angle in the transverse or horizontal direction (such as an included angle of 90 degrees in a horizontal plane).

Figure 6:
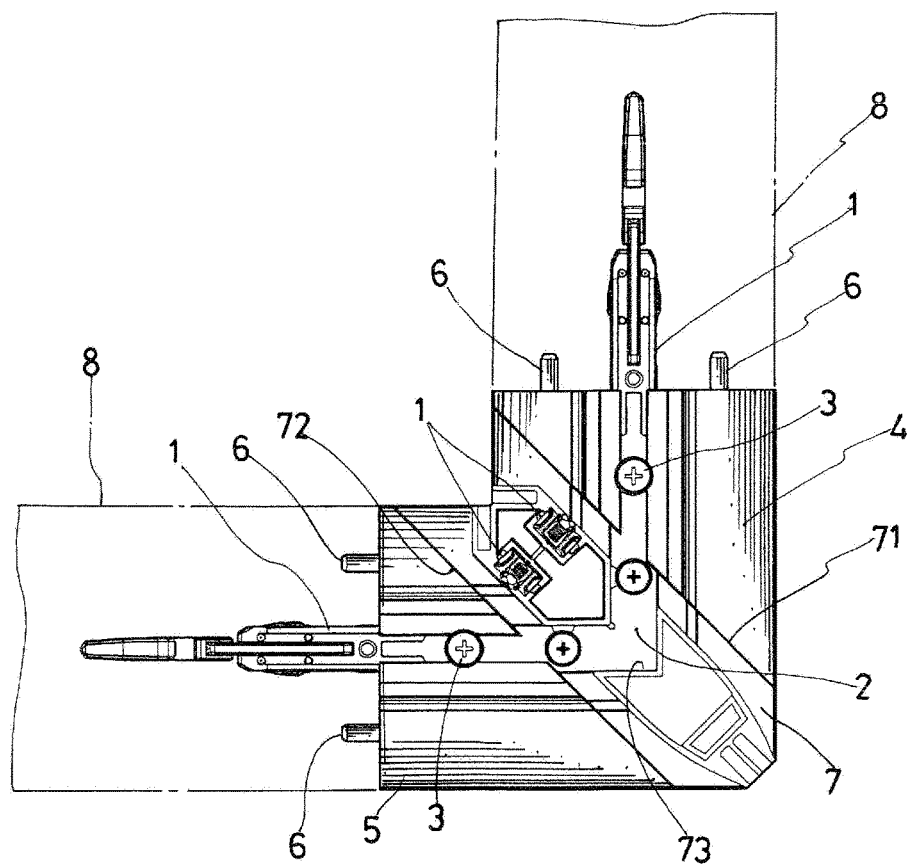
FIG. 6 is a top plan view of the second embodiment of the aluminum extrusion connection device according to the present invention.
Figure 7:
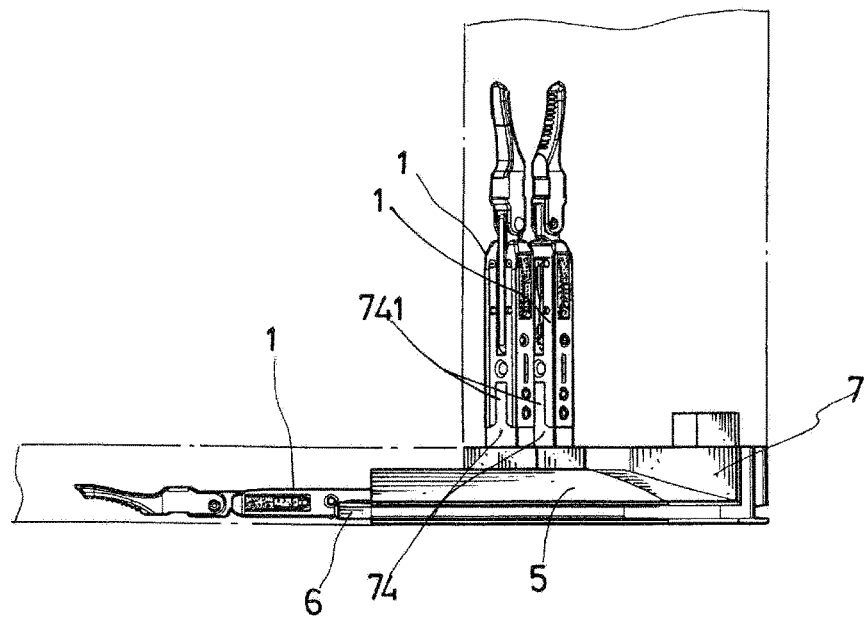
FIG. 7 is a side elevational view of the second embodiment of the aluminum extrusion connection device according to the present invention.

To assemble, the right-angled portion (the angle) of the direction-change coupling member 2 is first positioned in the jointing trough 73 of the third aluminum extrusion plate 7 in such a way that one of the connection members 1 extends in a direction to project outside the third aluminum extrusion plate 7 and the other one of the connection members 1 extends in a different direction to project outside the third aluminum extrusion plate 7. The third jointing sections 741 of the jointing blocks 74 of the third aluminum extrusion plate 7 are each connected, in the vertical direction, to the second open grooves 12 of one of the remaining two connection members 1. The one of the connection members 1 and the first coupling section 21 of the direction-change coupling member 2 are received into and partly through the first fitting slot 41 of the first aluminum extrusion plate 4 to set the first aluminum extrusion plate 4 at a location corresponding to the first coupling section 21 and the other one of the connection members 1 and the second coupling section 22 of the direction-change coupling member 2 are received into and partly through the second fitting slot 51 of the second aluminum extrusion plate 5 to set the second aluminum extrusion plate 5 at a location corresponding to the second coupling section 22. In this way, the first aluminum extrusion plate 4 and the second aluminum extrusion plate 5 respectively and securely connected to the first jointing end 71 and the second jointing end 72 of the third aluminum extrusion plate 7 to form a connection module involving a corner (as shown in FIGS. 6 and 7).

As such, with the two connection members 1 respectively extending outside the first aluminum extrusion plate 4 and the second aluminum extrusion plate 5, each of the two connection members 1 can be used to connect a fourth aluminum extrusion plate 8 (as shown in FIG. 8). The fourth aluminum extrusion plate 8 may be formed with a third fitting slot 81 and two third positioning holes 82 that are formed in two opposite sides of the third fitting slot 81. With the connection members 1 each received into and partly through the third fitting slot 81 of the fourth aluminum extrusion plate 8 such that the pressing stem 14 of the connection member 1 is fit into the third fitting slot 81, the compression blocks 15 arranged on two opposite sides of the connection member 1 can be set in engagement with the third fitting slot 81 so as to have the connection member 1 securely fixed to the fourth aluminum extrusion plate 8. Further, with the fourth aluminum extrusion plate 8 connected to the first aluminum extrusion plate 4, the third positioning holes 82 of the fourth aluminum extrusion plate 8 and the first positioning holes 42 of the first aluminum extrusion plate 4 may respectively receive fixing rods 6 to insert therein and with the fourth aluminum extrusion plate 8 connected to the second aluminum extrusion plate 5, the third positioning holes 82 of the fourth aluminum extrusion plate 8 and the second positioning holes 52 of the second aluminum extrusion plate 5 may respectively receive fixing rods 6 to insert therein. In this way, the two fourth aluminum extrusion plates 8 that are provided and prepared in advance may each be connected to a corner made up of and defined by the first aluminum extrusion plate 4 and the second aluminum extrusion plate 5 to allow an operator to carry out an installation operation as required to fast construct a corner connection between two pre-pared fourth aluminum extrusion plates 8 and thus effectively reduce operation time of installation and fast complete a systematic structure.

It is noted that the first aluminum extrusion plate 4, the second aluminum extrusion plate 5, and the third aluminum extrusion plate 7 are connected to fourth aluminum extrusion plates 8 by means of the connection members 1, wherein the connection members 1 are press-fit into and thus coupled to the first aluminum extrusion plate 4, the second aluminum extrusion plate 5, and the third aluminum extrusion plate 7 to achieve assembly of a serial and systematic structure in an efficient and effective manner and provide an advantage of being reusable for repeated mounting and dismounting.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A multidirectional aluminum extrusion connection device applicable to connection with at least two fourth aluminum extrusion plates, wherein the fourth aluminum extrusion plates are each formed with a third fitting slot, the aluminum extrusion connection device comprising:

two connection members, wherein each of the connection members is formed with a first open groove in one end thereof and a second open groove in another end thereof, the first open groove being pivotally connected with a bar to allow the bar to be movable up and down in the first open groove, an opposite end of the bar extending outside the first open groove and pivotally connected with a pressing stem, the connection members being provided on each of two opposite sides thereof with a compression block;

a direction-change coupling member, which is connectable with the two connection members, the direction-change coupling member being provided with a first coupling section at one end thereof and a second coupling section at the other end thereof, the first coupling section and the second coupling section being arranged to extend in different directions so that the first coupling section and the second coupling section define therebetween an angle, the first coupling section being connectable to the second open groove of one of the connection members, the second coupling section being connectable to the second open groove of the other one of the connection members;

a first aluminum extrusion plate, which is connectable with one of the connection members, the first aluminum extrusion plate being formed with a first fitting slot, said one of the connection members and the first coupling section of the direction-change coupling member being received into and set in the first fitting slot to set the first aluminum extrusion plate at a location corresponding to the first coupling section and the connection member received through the first fitting slot to project outside the first aluminum extrusion plate; and a second aluminum extrusion plate, which is connectable with the other one of the connection members, the second aluminum extrusion plate being formed with a second fitting slot, said the other one of the connection members and the second coupling section of the direction-change coupling member being received into and set in the second fitting slot to set the second aluminum extrusion plate at a location corresponding to the second coupling section and connection member through the second fitting slot to project outside the second aluminum extrusion plate.

2. The multidirectional aluminum extrusion connection device according to claim 1, wherein the first coupling section and the second coupling section define therebetween a right angle in a vertical plane.

3. The multidirectional aluminum extrusion connection device according to claim 1, wherein the direction-change coupling member is formed with a fastening hole at a location adjacent to the first coupling section and the direction-change coupling member is also formed with a fastening hole at a location adjacent to the second coupling section, the fastening hole of the first coupling section being located in the first fitting slot and fastened with a third fastening element, the fastening hole of the second coupling section being located in the second fitting slot and fastened with a second third fastening element.

4. The multidirectional aluminum extrusion connection device according to claim 1, wherein the first aluminum extrusion plate is formed with a first positioning hole in each of two opposite sides of the first fitting slot and the second aluminum extrusion plate is formed with a second positioning hole in each of two opposite sides of the second fitting slot, the two first positioning holes of the first aluminum extrusion plate each receiving a fixing rod to insert therein, the two second positioning holes of the second aluminum extrusion plate each receiving an opposite end of the fixing rod to insert therein.

5. The multidirectional aluminum extrusion connection device according to claim 1, wherein the first aluminum extrusion plate is set at a location corresponding to the first coupling section of the direction-change coupling member and the second aluminum extrusion plate is set at a location corresponding to the second coupling section of the direction-change coupling member so that the first aluminum extrusion plate and the second aluminum extrusion plate are connected in a position-shifted manner with the pressing stem and the two compression blocks of one of the connection members fit into the third fitting slot of one of the fourth aluminum extrusion plates so that the one of the fourth aluminum extrusion plates and the first aluminum extrusion plate are connected and the pressing stem and the two compression blocks of the other one of the connection members fit into the third fitting slot of the other one of the fourth aluminum extrusion plate so that the other one of the fourth aluminum extrusion plates and the second aluminum extrusion plate are connected.

6. The multidirectional aluminum extrusion connection device according to claim 1, comprising a third aluminum extrusion plate, wherein the third aluminum extrusion plate is coupled to the direction-change coupling member, the third aluminum extrusion plate being provided with a first jointing end on one lateral side thereof and a second jointing end on another lateral side thereof, the third aluminum extrusion plate being partly recessed to form a jointing trough, the angle of the direction-change coupling member being positioned in the jointing trough such that the connection member at the location corresponding to the first coupling section extends outside the third aluminum extrusion plate and the connection member at the location corresponding to the second coupling section extends outside the third aluminum extrusion plate, one of the connection members and the first coupling section of the direction-change coupling member being received in and through the first fitting slot to set the first aluminum extrusion plate at a location corresponding to the first coupling section and connected to the first jointing end of the third aluminum extrusion plate with the connection member that is received through the first fitting slot projecting outside the first aluminum extrusion plate, the other one of the connection members and the second coupling section of the direction-change coupling member being received into and through the second fitting slot to set the second aluminum extrusion plate at a location corresponding to the second coupling section and connected to the second jointing end of the third aluminum extrusion plate, with the connection member that is received through the second fitting slot projecting outside the second aluminum extrusion plate, the first aluminum extrusion plate being at a location corresponding the first coupling section of the direction-change coupling member and the first jointing end, the second aluminum extrusion plate being at a location corresponding to the second coupling section of the direction-change coupling member and the second jointing end, so that the first aluminum extrusion plate and the second aluminum extrusion plate are connected in a position-shifted manner, the pressing stem and the two compression blocks of one of the connection members being fit into the third fitting slot of one of the fourth aluminum extrusion plates to have one of the fourth aluminum extrusion plates and the first aluminum extrusion plate connected, the pressing stem and the two compression blocks of the other one of the connection members being fit into the third fitting slot of the other one of the fourth aluminum extrusion plates to have the other one of the fourth aluminum extrusion plates and the second aluminum extrusion plate connected.

7. The aluminum extrusion connection device according to claim 6, wherein the third aluminum extrusion plate is provided in a vertical direction with at least two jointing blocks, each of the jointing blocks being formed with a third jointing section extending upward, the third jointing sections being connected, in a vertical direction, to the second open grooves of the connection members.

8. The multidirectional aluminum extrusion connection device according to claim 6, wherein the first aluminum extrusion plate is formed with a first positioning hole in each of two opposite sides of the first fitting slot, the second aluminum extrusion plate being formed with a second positioning hole in each of two opposite sides of the second fitting slot, the fourth aluminum extrusion plates being each formed with a third positioning hole in each of two opposite sides of the third fitting slot, the first positioning hole and the third positioning hole of one of the fourth aluminum extrusion plates receiving a fixing rod to insert therein, the second positioning hole and the third positioning hole of the other one of the fourth aluminum extrusion plates receiving a second fixing rod to insert therein.

\* \* \* \* \*